US011997141B2

(12) United States Patent
Schutt et al.

(10) Patent No.: US 11,997,141 B2
(45) Date of Patent: May 28, 2024

(54) ATTESTATION AND COMPUTER FORENSICS BASED ON UNIVERSAL REFERENCES FOR HARDWARE AND/OR SOFTWARE CONFIGURATIONS

(71) Applicant: Cisco Technology, Inc., San Jose, CA (US)

(72) Inventors: Jeffrey G. Schutt, Davis, CA (US); Edward A. Warnicke, Austin, TX (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 286 days.

(21) Appl. No.: 17/506,838

(22) Filed: Oct. 21, 2021

(65) Prior Publication Data
US 2023/0126959 A1 Apr. 27, 2023

(51) Int. Cl.
*H04L 29/06* (2006.01)
*H04L 9/40* (2022.01)

(52) U.S. Cl.
CPC .......... *H04L 63/20* (2013.01); *H04L 63/04* (2013.01); *H04L 63/0876* (2013.01)

(58) Field of Classification Search
None
See application file for complete search history.

(56) References Cited

U.S. PATENT DOCUMENTS

| | | | | |
|---|---|---|---|---|
| 6,324,647 | B1 * | 11/2001 | Bowman-Amuah | ... H04L 51/00 713/153 |
| 6,615,166 | B1 * | 9/2003 | Guheen | ... G06Q 10/06 703/27 |

(Continued)

OTHER PUBLICATIONS

Maene, Pieter et al. Hardware-Based Trusted Computing Architectures for Isolation and Attestation. IEEE Transactions on Computers, vol. 67, Issue: 3. https://ieeexplore.ieee.org/stamp/stamp.jsp?tp=&arnumber=7807249 (Year: 2018).*

(Continued)

*Primary Examiner* — Jeremiah L Avery
(74) *Attorney, Agent, or Firm* — Edell, Shapiro & Finnan, LLC

(57) ABSTRACT

A method, computer system, and computer program product are provided for performing policy enforcement, attestation, and network forensics. A universal reference for a computing entity is obtained, wherein the universal reference identifies one or more components of the computing entity by additional universal references assigned to the one or more components. A hierarchical description of the computing entity is determined by enumerating each additional universal reference of the one or more components and additional sub-components, wherein the hierarchical description exhaustively identifies the components and sub-components of the computing entity. The hierarchical description is analyzed by accessing a database to identify mappings of the one or more additional universal references to the one or more components and sub-components. The one or more components and sub-components identified by the analyzing are assessed to perform one or more of: an inventory task, a policy enforcement task, an attestation task, and a forensics task.

20 Claims, 8 Drawing Sheets

(56) References Cited

U.S. PATENT DOCUMENTS

| | | | | |
|---|---|---|---|---|
| 7,171,379 B2* | 1/2007 | Menninger | ............ | G06Q 10/06 705/28 |
| 7,315,826 B1* | 1/2008 | Guheen | ............. | G06Q 30/0201 705/7.29 |
| 10,360,168 B1 | 7/2019 | Griffin et al. | | |
| 11,222,309 B2* | 1/2022 | Barday | ................ | H04L 67/535 |
| 2003/0056200 A1 | 3/2003 | Li et al. | | |
| 2007/0180490 A1* | 8/2007 | Renzi | ................... | G06F 21/604 726/1 |
| 2012/0036552 A1* | 2/2012 | Dare | .................. | H04L 41/0803 726/1 |
| 2013/0081134 A1* | 3/2013 | Glew | .................... | G06F 21/552 726/22 |
| 2015/0026688 A1* | 1/2015 | Dice | .................... | G06F 9/4881 718/102 |
| 2019/0004916 A1 | 1/2019 | Martinez et al. | | |
| 2019/0306282 A1* | 10/2019 | Masputra | ........... | G06F 9/44526 |
| 2020/0133735 A1 | 4/2020 | Zhao et al. | | |
| 2021/0136100 A1 | 5/2021 | Gupta et al. | | |
| 2021/0173711 A1* | 6/2021 | Crabtree | ............ | G06F 16/9024 |
| 2021/0192867 A1* | 6/2021 | Fang | ................... | G07C 5/0816 |
| 2021/0392155 A1* | 12/2021 | Waplington | ........ | H04L 63/1433 |
| 2022/0019698 A1* | 1/2022 | Durham | .................. | G06F 21/71 |
| 2022/0036302 A1* | 2/2022 | Cella | .................. | G06Q 10/0835 |
| 2022/0121644 A1* | 4/2022 | Boivie | ............... | G06F 16/2365 |
| 2022/0207163 A1* | 6/2022 | Gentleman | ......... | G06F 21/6218 |
| 2023/0297904 A1* | 9/2023 | Cella | ...................... | G06N 3/126 705/7.12 |

OTHER PUBLICATIONS

Morgan, Benoit et al. Design and Implementation of a Hardware Assisted Security Architecture for Software Integrity Monitoring. 2015 IEEE 21st Pacific Rim International Symposium on Dependable Computing (PRDC). https://ieeexplore.ieee.org/stamp/stamp.jsp?tp=&arnumber=7371862 (Year: 2015).*

Corteggiani, Nassim; Francillon, Aurelien. HardSnap: Leveraging Hardware Snapshotting for Embedded Systems Security Testing. 2020 50th Annual IEEE/IFIP International Conference on Dependable Systems and Networks (DSN). https://ieeexplore.ieee.org/stamp/stamp.jsp?tp=&arnumber=9153377 (Year: 2020).*

Wikipedia, "Merkle tree," https://en.wikipedia.org/w/index.php?title=Merkle_tree&oldid=1048067804, Oct. 4, 2021, 5 pages.

Git, "10.3 Git Internals—Git References," https://git-scm.com/book/en/v2/Git-Internals-Git-References, retrieved Oct. 21, 2021, 4 pages.

* cited by examiner

ATTESTATION AND COMPUTER FORENSICS BASED ON UNIVERSAL REFERENCES FOR HARDWARE AND/OR SOFTWARE CONFIGURATIONS

TECHNICAL FIELD

The present disclosure relates to computing network security, and more specifically, to performing attestation and digital forensics tasks based on universal references for hardware and/or software configurations.

BACKGROUND

In the field of computing network security, attestation and digital forensics are important tools for the prevention of, or recovery from, security events such as unauthorized access, misuses, modification, or denial of a computer network or network-accessible resources. Attestation refers to a mechanism for computing devices to verify aspects of themselves (e.g., providing their identity, providing hardware or software components, etc.), with a goal of proving to a remote party that the operating system, software, and/or hardware is intact, free of vulnerabilities, and trustworthy. Computer forensics relates to the monitoring and analysis of computer functionality, network traffic, and the like, for the purposes of information gathering, collection of legal evidence, or intrusion detection.

When performing forensics or attestation tasks, knowledge about the contents of an executable software object are desired, but can be insufficient. In order to make fully informed decisions, network administrators would benefit from having additional details, such as the kernel of the system in which software is executing, the hardware state of the device upon which software is executing, the configuration of the running software, and additional details.

DESCRIPTION OF EXAMPLE EMBODIMENTS

Overview

Figure 1:
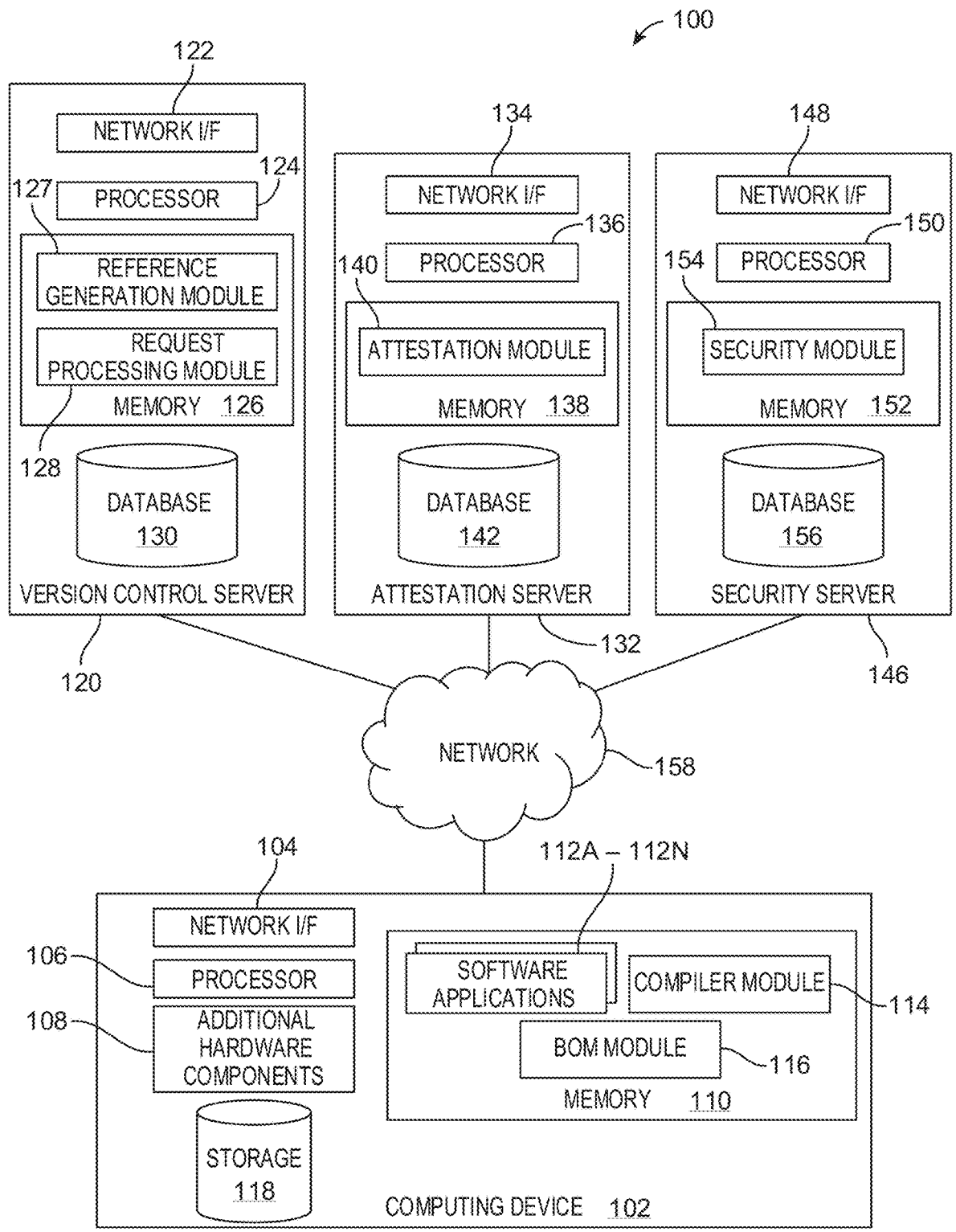
FIG. 1 is a block diagram depicting an environment for performing attestation and network forensics tasks, in accordance with an example embodiment.

According to one embodiment, techniques are provided for performing policy enforcement, attestation and forensics based on universal references for hardware, firmware, and/or software objects. A universal reference for a computing entity is obtained, wherein the universal reference identifies one or more components of the computing entity by additional universal references assigned to the one or more components. A hierarchical description of the computing entity is determined by enumerating each additional universal reference of the one or more components and additional sub-components, wherein the hierarchical description exhaustively identifies the components and sub-components of the computing entity. The hierarchical description is analyzed by accessing a database to identify mappings of the one or more additional universal references to the one or more components and sub-components. The one or more components and sub-components identified by analyzing hierarchical description are assessed to perform one or more of: an inventory task, a policy enforcement task, an attestation task, and a forensics task.

Example Embodiments

Embodiments are provided for performing computing and network security tasks, and more specifically, for performing inventory, policy enforcement, attestation and digital forensics tasks based on universal references for hardware and/or software configurations.

In the field of network security, network administrators seek to protect the integrity, confidentiality, and availability of computer networks, data, and devices using a variety of technologies. Inventory, or knowledge of a computing device's software and hardware configurations, can be extremely useful for security purposes, as individual components can be associated with specific vulnerabilities. For attestation, the decision of whether or not to trust a computing device may depend on the software and hardware of the device; for example, if any components are associated with a security threat, then the computing device may not be attested. If the origin of a security threat is unknown, affected devices could also be compared with respect to their software and hardware components in order to identify commonalities that could represent the source of the security threat. However, conventional approaches to network security do not typically obtain a comprehensive listing of software components and/or hardware components, and there is no consistent, universal approach to describing the constituent elements of a hardware and/or software configuration.

Accordingly, present embodiments solve this problem by providing a universal reference that is unique for each combination of hardware and/or software elements. As referred to herein, a computing entity can be defined as any combination of software and/or hardware elements. The universal reference can have a small data footprint (e.g., 20 bytes), and can be used to determine with specificity an exhaustive listing of all components of a computing entity. This universal reference is obtained by representing software and/or hardware components using a hierarchical description in which relationships between components and sub-components are defined. A universal reference can then be generated for each component in the hierarchical description based on the sub-components immediately below the component in the hierarchical description. By nature of the hierarchical description, the universal references of the components and sub-components enable an exhaustive description of any software and/or hardware configuration to be obtained via a single universal reference. In particular, the hierarchical description may be similar to a Merkle tree, in which leaf nodes are labeled with hashes of data blocks, and non-leaf nodes store hashes of child nodes. The relationships between universal references and the components of the computing entity with which each universal reference is associated can be stored in a trusted repository. The repository can be queried using a universal reference to identify the hardware/software components. Additionally, universal references can be used to quickly determine whether a particular software and/or hardware configuration includes any known good and/or bad components.

Thus, present embodiments provide the practical application of enabling any software and/or hardware configuration to be succinctly and exhaustively described, no matter how complex, in a consistent manner by providing a universal reference to describe any possible combination of constituent hardware and/or software elements. The knowledge of constituent software and/or hardware elements, or inventory, can be used for policy enforcement or attestation purposes by determining whether a computing entity includes any hardware or software with known vulnerabilities, exploits, or other issues. Moreover, universal references can be logged for security purposes, and when a security event impacts a group of different software objects and/or hardware configurations, their universal references can be used to obtain and compare hierarchical descriptions in order to identify common components that are likely associated with the security event. Accordingly, claimed embodiments improve the fields of computer and network security by enabling an exhaustive description of any combination of software and/or hardware to be easily captured using a lightweight universal reference that can, for example, be inserted into Hypertext Transfer Protocol (HTTP) headers, compiled into software to provide self-referential executables, and/or otherwise shared in order to achieve any desired computing security goal.

It should be noted that references throughout this specification to features, advantages, or similar language herein do not imply that all of the features and advantages that may be realized with the embodiments disclosed herein should be, or are in, any single embodiment. Rather, language referring to the features and advantages is understood to mean that a specific feature, advantage, or characteristic described in connection with an embodiment is included in at least one embodiment. Thus, discussion of the features, advantages, and similar language, throughout this specification may, but do not necessarily, refer to the same embodiment.

Furthermore, the described features, advantages, and characteristics may be combined in any suitable manner in one or more embodiments. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages will become more fully apparent from the following drawings, description and appended claims, or may be learned by the practice of embodiments as set forth hereinafter.

Embodiments are now described in detail with reference to the figures. FIG. 1 is a block diagram depicting an environment 100 for performing attestation and network forensics tasks, in accordance with an example embodiment. As depicted, environment 100 includes a computing device 102, a version control server 120, an attestation server 132, a security server 146, and a (communication) network 158. It is to be understood that the functional division among components of environment 100 have been chosen for purposes of explaining various embodiments and is not to be construed as a limiting example.

Computing device 102 includes a network interface (I/F) 104, at least one processor 106, additional hardware components 108, memory 110, and storage 118. Memory 110 stores software instructions for software applications 112A-112N, a compiler module 114, and a Bill of Materials (BOM) module 116. Computing device 102 may include, for example, a laptop computer, a tablet computer, a netbook computer, a personal computer (PC), a desktop computer, a personal digital assistant (PDA), a smart phone, a thin client, a rack-mounted server, or any programmable electronic device capable of executing computer readable program instructions. Network interface 104 may include one or more network interface cards, line cards, etc., and enables components of computing device 102 to send and receive data over a network, such as network 158. In general, computing device 102 represents any configuration of software and/or hardware components that can be described using a universal reference in accordance with the embodiments presented herein. Computing device 102 may include internal and external hardware components, as depicted and described in further detail with respect to FIG. 8.

Additional hardware components 108 may include any hardware elements associated with computing device 102, each of which can be described using a universal reference. Additionally, the constituent elements of each of the additional hardware components 108 can also be described with a universal reference. For example, a camera may have a universal reference for itself that indicates a component of the camera, such as a particular complementary metal-oxide semiconductor (CMOS) image sensor, via another universal reference. As a non-exhaustive listing for illustrative purposes, additional hardware components 108 can include cameras, graphical processing units (GPUs), peripheral devices (keyboards, mice, microphones, speakers, etc.), application-specific integrated circuits (ASICs), sensors, batteries, and the like. In some embodiments, computing device 102 may be a computer associated with a vehicle, robot, scientific equipment, diagnostic device, and the like, and additional hardware components 108 may include specialized elements such as motors, lasers, transceivers, robotic components, propellers, x-ray generators, liquid pumps, transducers, and the like.

Software applications 112A-112N, compiler module 114, and BOM module 116 may include one or more modules or units to perform various functions of the embodiments described below. Software applications 112A-112N, compiler module 114, and BOM module 116 may be implemented by any combination of any quantity of software and/or hardware modules or units, and may reside within memory 110 of computing device 102 for execution by a processor, such as processor 106.

Software applications 112A-112N can include any executable software application, each of which can be described using a universal reference. Additionally, the modules that constitute each software application 112A-122N can also be described with their own universal reference. For example, a software application may be assigned a universal reference that indicates that the software application includes a plug-in or extension, and the plug-in or extension can be assigned its own universal reference (which is referenced by the parent software application's universal reference). Software applications 112A-112N can include, for example, word processors, web browsers, games and entertainment applications, mail and calendar applications, control software, modeling software, computer aided design (CAD) software, firmware, and any other executable software.

Compiler module 114 may include any conventional or other compiler that translates computer code written in one programming language into another language (e.g., machine-language instructions). Compiler module 114 may generate one or more of software applications 112A-112N. In order to create self-referential software objects, compiler module 114 may receive or obtain a universal reference for the software object being compiled and insert the universal reference into the compiled software object in a manner that embeds the software object's universal reference into the software object. Thus, a software object can self-identify using its universal reference for attestation and other security tasks.

BOM module 116 manages one or more bills of materials for software and/or hardware associated with computing device 102. A bill of materials is a list of components for a computing entity, including any software or hardware object. Each bill of materials may have a hierarchical schema in which the top level represents an object itself and lower levels represent sub-components. Each component can be referenced in a bill of material by any identifier, including a name, version number, universal unique identifier (UUID), hardware identifier (e.g., vendor-defined strings used to identify devices), and the like. In some embodiments, BOM module 116 scans computing device 102 and obtains bills of materials for each hardware and/or software component. BOM module 116 may obtain bills of materials from one or more network-accessible locations associated with manufacturers or vendors. In some embodiments, one or more bills of materials are provided to computing device 102 by the software and/or hardware components themselves.

Storage 118 may include any non-volatile storage media known in the art. For example, storage 118 can be implemented with a tape library, optical library, one or more independent hard disk drives, or multiple hard disk drives in a redundant array of independent disks (RAID). Similarly, data in storage 118 may conform to any suitable storage architecture known in the art, such as a file, a relational database, an object-oriented database, and/or one or more tables. Storage 118 may store data relating to software and/or hardware components of computing device 102, including bills of materials, and universal references for computing entities.

Version control server 120 includes a network interface (I/F) 122, at least one processor 124, memory 126, and a database 130. Memory 126 stores software instructions for a reference generation module 127 and a request processing module 128. Version control server 120 may include a rack-mounted server, or any other programmable electronic device capable of executing computer readable program instructions. Network interface 122 may include one or more network interface cards, line cards, etc., and enables components of version control server 120 to send and receive data over a network, such as network 158. In general, version control server 120 creates universal references, stores associations between software and/or hardware configurations and their respective universal references, and processes queries to identify the components of computing entities based on their universal references. In some embodiments, version control server 120 performs other distributed version control system functions, and may include, for example, a Git server. Version control server 120 may include internal and external hardware components, as depicted and described in further detail with respect to FIG. 8. Version control server 120 may be embodied as a software application 112A-112N running on a computing device 102.

Reference generation module 127 and request processing module 128 may include one or more modules or units to perform various functions of the embodiments described below. Reference generation module 127 and request processing module 128 may be implemented by any combination of any quantity of software and/or hardware modules or units, and may reside within memory 126 of version control server 120 for execution by a processor, such as processor 124.

Reference generation module 127 may generate universal references for computing entities in accordance with present embodiments. A computing entity can include software, hardware, firmware, or combinations thereof, such as an executable software object, runtime libraries used by the software object at execution, and the hardware configuration upon which the software object executes. These hardware/software elements may also be referred to as artifacts. In general, a computing entity's artifacts are processed by reference generation module 127 to generate universal references. The contents of each artifact are stored in the reference generation module 127 as an object. Each object may be stored as a binary file (e.g., a Git binary large object (blob)). A universal reference is created for each object by computing a cryptographic hash of the object. If the artifact contains child artifacts, the universal references of those child artifacts are combined into another object, referred to as the bill of materials (BOM) object, which is hashed to create the BOM universal reference for these child artifacts. Universal references for the immediate leaf nodes of the given artifact are listed alongside a BOM universal reference of any child nodes to create a hierarchical representation of the artifact and its subcomponents.

Thus, the specific BOM object (e.g., Git reference) that is associated with the parent artifact at the very top of the hierarchical representation will include the universal references of its immediate child artifacts; each child artifact's own universal reference indicates its child artifacts, etc., thus enabling a computing entity to be exhaustively described using a single BOM object (i.e. the hash of the object of the uppermost parent artifact of the hierarchy combined with the hash of the child artifacts' born object universal references). Generation of universal references is depicted and described in further detail with respect to FIGS. 3-5.

Request processing module 128 processes requests that include universal references to determine an exhaustive listing of the components of the computing entities associated with the universal references. When a universal reference is received, request processing module 128 may query database 130 to determine the object associated with the universal reference; the contents of the object indicate all of the artifacts that are immediate children of the computing entity by their own universal references. Request processing module 128 may iteratively look up each child artifact's children until a full listing of all components of the computing entity is obtained. Request processing module 128 can then respond to a request with the exhaustive listing of components associated with the computing entity whose universal reference was provided in the request. In some embodiments, request processing module 128 may only provide a portion of the components of a computing entity; for example, if only software components are relevant, then the request may include an indication to only return the software components.

Database 130 may include any non-volatile storage media known in the art. For example, database 130 can be implemented with a tape library, optical library, one or more independent hard disk drives, or multiple hard disk drives in a redundant array of independent disks (RAID). Similarly, data in database 130 may conform to any suitable storage architecture known in the art, such as a file, a relational database, an object-oriented database, and/or one or more tables. Database 130 may store associations between universal references and objects (e.g., Git blobs) that in turn contain other universal references. Database 130 may also store associations between objects and the identities of the particular computing entities that each object represents.

Attestation server 132 includes a network interface (I/F) 134, at least one processor 136, memory 138, and a database 142. Memory 138 stores software instructions for an attestation module 140. Attestation server 132 may include a rack-mounted server, or any other programmable electronic device capable of executing computer readable program instructions. Network interface 122 may include one or more network interface cards, line cards, etc., and enables components of attestation server 132 to send and receive data over a network, such as network 158. In general, attestation server 132 performs attestation tasks using universal references. Attestation server 132 may include internal and external hardware components, as depicted and described in further detail with respect to FIG. 8.

Attestation module 140 may include one or more modules or units to perform various functions of the embodiments described below. Attestation module 140 may be implemented by any combination of any quantity of software and/or hardware modules or units, and may reside within memory 138 of attestation server 132 for execution by a processor, such as processor 136.

Attestation module 140 may attest computing entities by comparing the universal references of the entities to a list that indicates whether a universal reference should be trusted or not. Attestation module 140 can expand a single universal reference into an exhaustive list of universal references for a computing entity by sending the universal reference to version control server 120 for processing by request processing module 128. In some embodiments, attestation module 140 may determine the identities of software entities associated with each universal reference, and attest each item based on the identity rather than the universal reference for the item. Thus, attestation module 140 can determine, using a single universal reference, the entire makeup of a particular computing entity, and thereby determine whether the computing entity has any particular software and/or hardware components that are flagged as untrustworthy.

In some embodiments, attestation module 140 performs inventory tasks by tracking an inventory of devices using their universal references. Configuration files for all processes running on a host in a specific environment can be hardened and approved, and universal references can be created for those validated files. Universal references for all validated files in an environment can be combined with the rest of the universal references for a running host to create a comprehensive universal reference. Additionally or alternatively, as each new image file (including operating system, executables, environmental variables, configuration files, data, etc.) is validated, the validated image file's universal reference can be added to a list of approved universal references. For example, in a Kubernetes environment, a single universal reference can convey a description of an entire containerized application, including pods, main containers, sidecar containers, and the like. Thus, inventory management can be performed, and security policies can be enforced, using universal references. For example, if a computing entity having an untrusted universal reference is identified in an environment, a security policy can terminate execution of the computing entity, deny the computing entity network access, and the like.

Database 142 may include any non-volatile storage media known in the art. For example, database 142 can be implemented with a tape library, optical library, one or more independent hard disk drives, or multiple hard disk drives in a redundant array of independent disks (RAID). Similarly, data in database 142 may conform to any suitable storage architecture known in the art, such as a file, a relational database, an object-oriented database, and/or one or more tables. Database 142 may store data relating to attestation, including a listing of known trustworthy hardware and/or software components, and/or a listing of known untrustworthy hardware and/or software components, and/or a list of known trustworthy/untrustworthy universal references.

Security server 146 includes a network interface (I/F) 148, at least one processor 150, memory 152, and a database 156. Memory 152 stores software instructions for a security module 154. Security server 146 may include a rack-mounted server, or any other programmable electronic device capable of executing computer readable program instructions. Network interface 148 may include one or more network interface cards, line cards, etc., and enables components of security server 146 to send and receive data over a network, such as network 158. In general, security server 146 may include any server, network, or system for which a secure environment is desired. Security server 146 may include internal and external hardware components, as depicted and described in further detail with respect to FIG. 8.

Security module 154 may include one or more modules or units to perform various functions of the embodiments described below. Security module 154 may be implemented by any combination of any quantity of software and/or hardware modules or units, and may reside within memory 152 of security server 146 for execution by a processor, such as processor 150.

Security module 154 may automatically identify root causes of security events, such as unauthorized access events, or other events, such as program errors and bugs, etc., by analyzing a group of computing entities that are all impacted by the same event, and comparing the universal references of the computing entities' components to identify commonalities. In another implementation, security module 154 may use the universal reference for each impacted computing entity to obtain an exhaustive listing of hardware and/or software components, and directly compare components across entities to identify common components. In either case, the identified common components can then be investigated to determine which component, or combination of components, is the root cause of the event. Additionally or alternatively, security module 154 can make policy decisions (e.g., perform policy tasks) using universal references, such as determining whether to permit or deny access based on a computing device's universal reference. In some embodiments, security module 154 may construct a hierarchical representation of each computing entity and identify commonalities using a largest common subtree algorithm to identify common subtrees, and accordingly, identify identical or similar hardware and/or software elements shared by different computing entities.

Database 156 may include any non-volatile storage media known in the art. For example, database 156 can be implemented with a tape library, optical library, one or more independent hard disk drives, or multiple hard disk drives in a redundant array of independent disks (RAID). Similarly, data in database 156 may conform to any suitable storage architecture known in the art, such as a file, a relational database, an object-oriented database, and/or one or more tables. Database 156 may store security logs that include universal references for computing devices that have accessed or requested access to security server 146 or other devices being monitored for security purposes.

Network 158 may include a local area network (LAN), a wide area network (WAN) such as the Internet, or a combination of the two, and includes wired, wireless, or fiber optic connections. In general, network 158 can be any combination of connections and protocols known in the art that will support communications between computing device 102, version control server 120, attestation server 132, and/or security server 146 via their respective network interfaces in accordance with the described embodiments.

Figure 2:
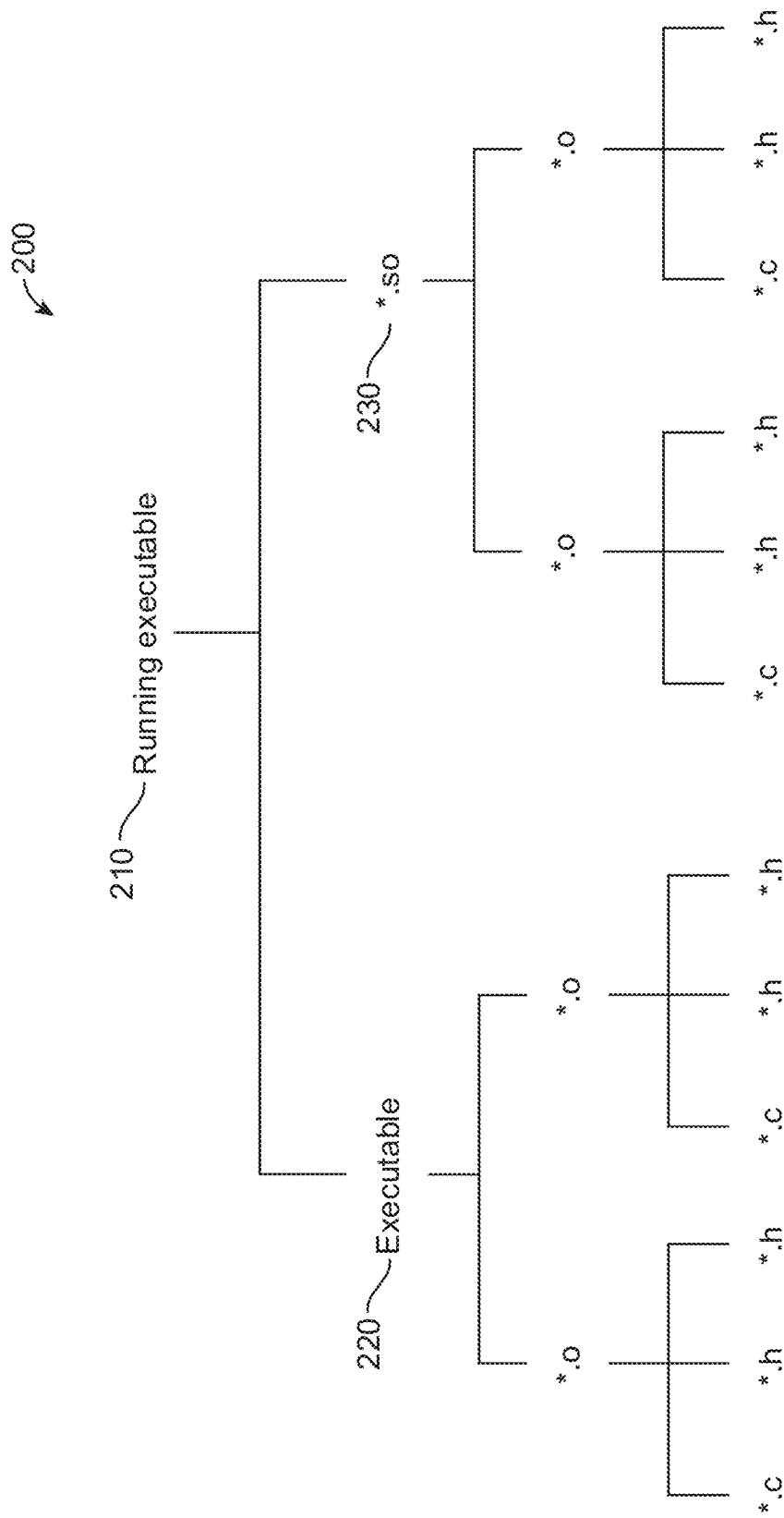
FIG. 2 is a tree diagram depicting a hierarchical description of a computing entity's artifacts, in accordance with an example embodiment.

FIG. 2 is a tree diagram depicting a hierarchical description 200 of a computing entity, in accordance with an example embodiment. In the depicted embodiment, the computing entity represented by hierarchical description 200 may include a C or C++ running executable 210. Running executable 210 may include as immediate child artifacts executable 220 and dynamic library 230 (*.so), which is not embedded in the binary of executable 220 but is utilized at runtime. Hierarchical description 200 also indicates that executable 220 includes child artifacts (*.o) which also have child artifacts (*.c, *.h); likewise, dynamic library 230 includes child artifacts (*.o) that also have child artifacts (*.c, *.h). Accordingly, hierarchical description 200 may represent an exhaustive description of the components of running executable 210, and as such, can be used for various security purposes, such as attestation and other tasks.

Figure 3:
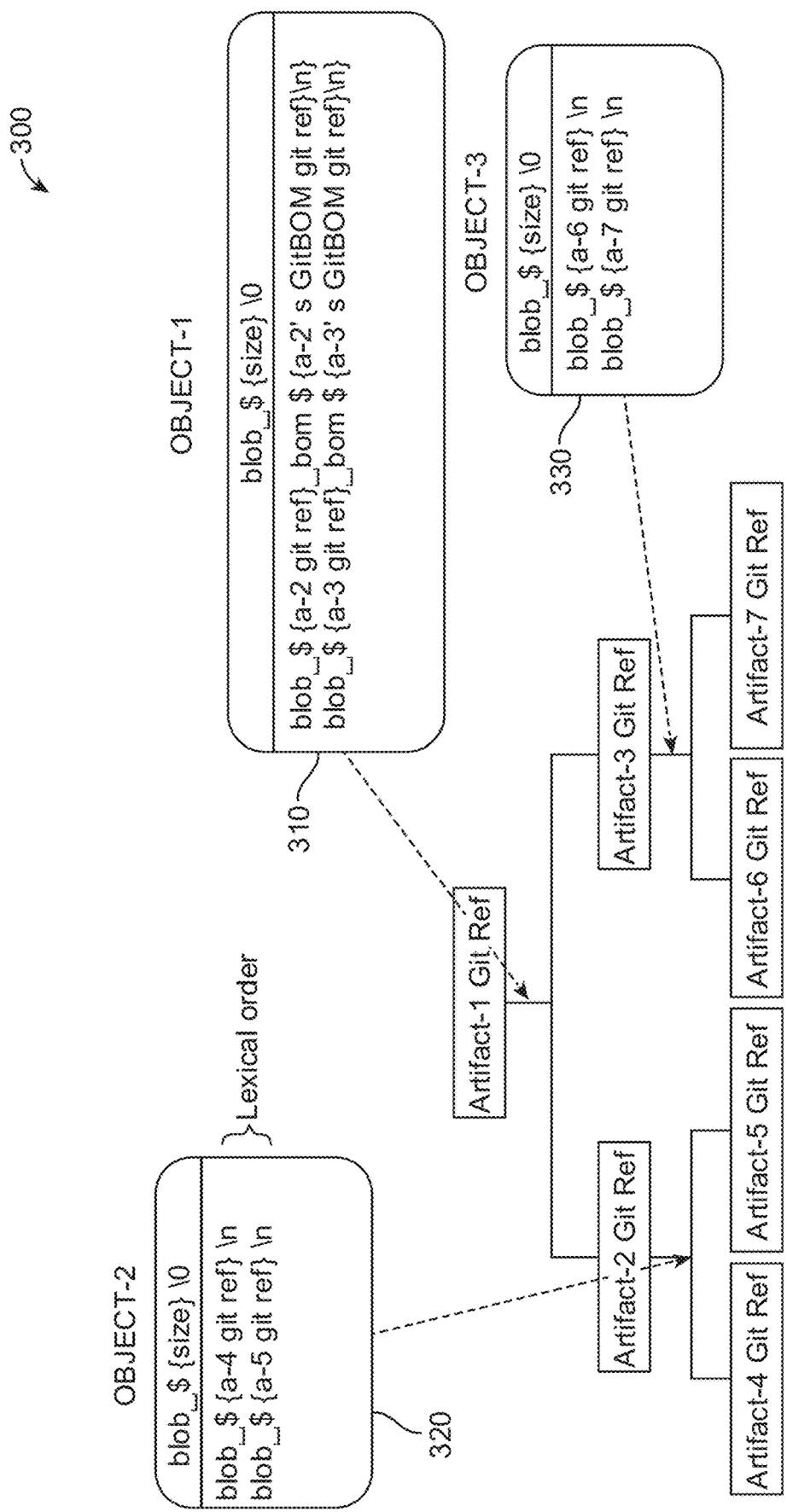
FIG. 3 is a tree diagram depicting a hierarchical description of universal references for a computing entity's artifacts composed into bill of materials (BOM) objects, in accordance with an example embodiment.

FIG. 3 is a tree diagram depicting a hierarchical description 300 of universal references for a computing entity's artifacts composed into bill of materials (BOM) objects, in accordance with an example embodiment. As depicted, a top-level BOM object ("object-1") has two immediate children ("object-2" and "object-3") which also have two immediate children each. Object-1 is a BOM object 310, which may be structured as a Git blob. The contents of object 310 include the universal references (e.g., "git ref") of its immediate children, artifact-2 and artifact-3 along with universal references to their BOM objects (e.g., "gitBOM git references" or "git refs"). Likewise, object 320, which is associated with artifact-2, includes as contents the universal references to its immediate children ("artifact-4" and "artifact-5"), and object 330, which is associated with artifact-3, includes as contents the universal references to its immediate children ("artifact-6" and "artifact-7").

Figure 4:
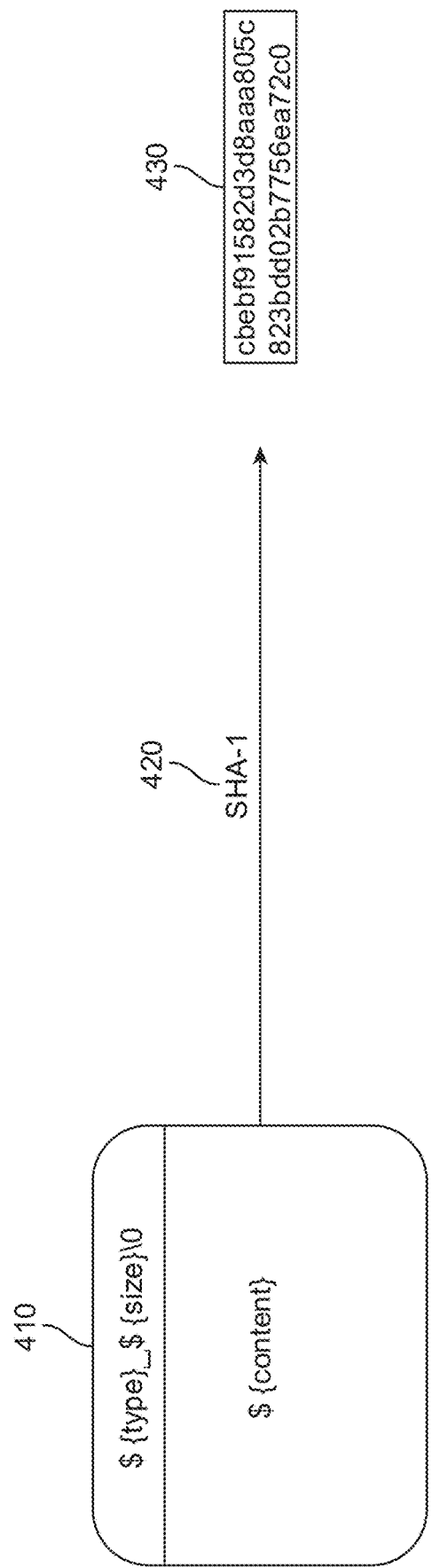
FIG. 4 is a block diagram depicting a universal reference being generated based on an object, in accordance with an example embodiment.

FIG. 4 is a block diagram depicting a universal reference 430 being generated based on an object 410, in accordance with an example embodiment. As depicted, object 410 has contents that can include one or more universal references for the immediate child artifacts of the artifact to which object 410 corresponds. A hashing algorithm 420, such as Secure Hash Algorithm 1 (SHA-1), may be applied to object 410 to generate universal reference 430, which may be a 40-character hexadecimal string. In various embodiments, the hashing algorithm 420 that is applied may include a collision-resistant hashing algorithm in order to ensure that universal references are unique for unique combinations of hardware and/or software.

Figure 5:
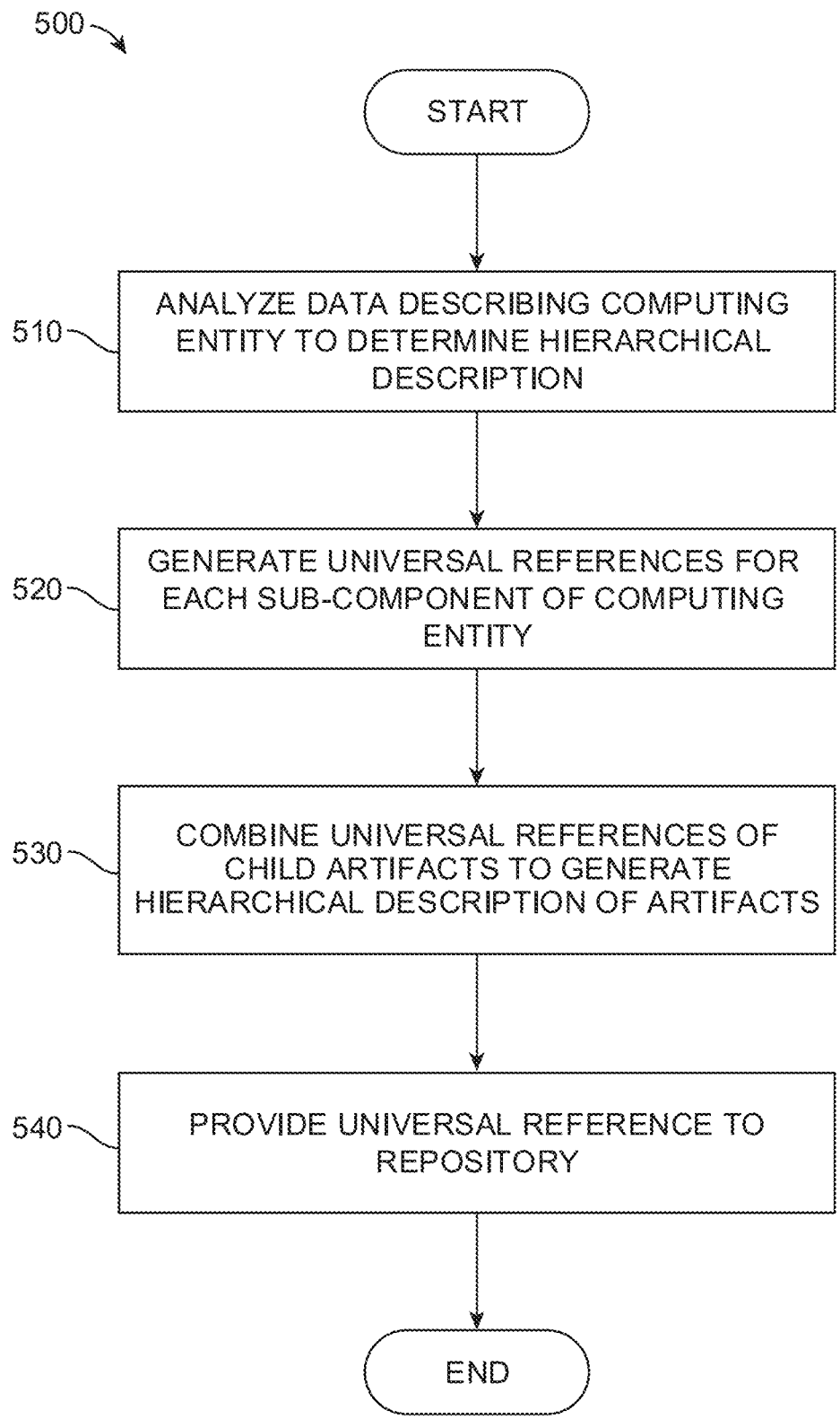
FIG. 5 is a flow chart depicting a method for generating a universal reference, in accordance with an example embodiment.

FIG. 5 is a flow chart depicting a method 500 for generating a universal reference, in accordance with an example embodiment.

Data describing a computing entity is analyzed to determine a hierarchical description at operation 510. The data may include a bill of materials (BOM) for the computing entity. In some embodiment, the BOM is a structured document that describes the components of the computing entity, and the relationships between components are explicitly defined, enabling the hierarchical description to be directly determined. In some embodiments, the BOM is at least partially unstructured, and relationships between components may require extraction by processing the BOM. In one embodiment, a natural language processing model may be utilized to analyze an unstructured description of a computing entity in order to extract relationships between components. The natural language processing model may be trained using a set of training data that includes examples of unstructured descriptions and the corresponding hierarchical descriptions based on those unstructured descriptions. In some embodiments there is no BOM and operation 510 requires evaluation of the artifacts' development, integration, and/or relationships such as might be contained in a version control server. Each artifact of the hierarchical description may be provided with a BOM object (e.g., a Git blob) whose contents cite, via universal references, the immediate child artifacts.

Universal references for each sub-component of the computing entity are generated at operation 520. Each sub-component may be processed using an algorithm, such as a collision-resistant hashing algorithm, to produce a string that is used as the universal reference. The algorithm may output strings of uniform length so that all universal references occupy a same number of bits. In some embodiments, any metadata contained in the object may be removed, so that same hardware or software components that include different descriptive or other details may be correctly mapped to the same universal references.

The universal references of child artifacts are combined to generate a hierarchical description of the artifacts at operation 530. This process is repeated for parent artifact, proceeding in a bottom-up approach through each tier of the hierarchy, until an exhaustive universal reference of a computing entity is generated.

The universal reference is provided to a repository at operation 540. Each generated universal reference may be provided to a repository along with the associated identities and/or universal references of the immediate child artifacts of the artifact from which the universal reference was generated. Accordingly, the repository may be queried to determine immediate child artifacts of a computing entity, and, using their universal references, queried again to determine their child artifacts, etc., until an exhaustive description of the computing entity's components is obtained.

Figure 6:
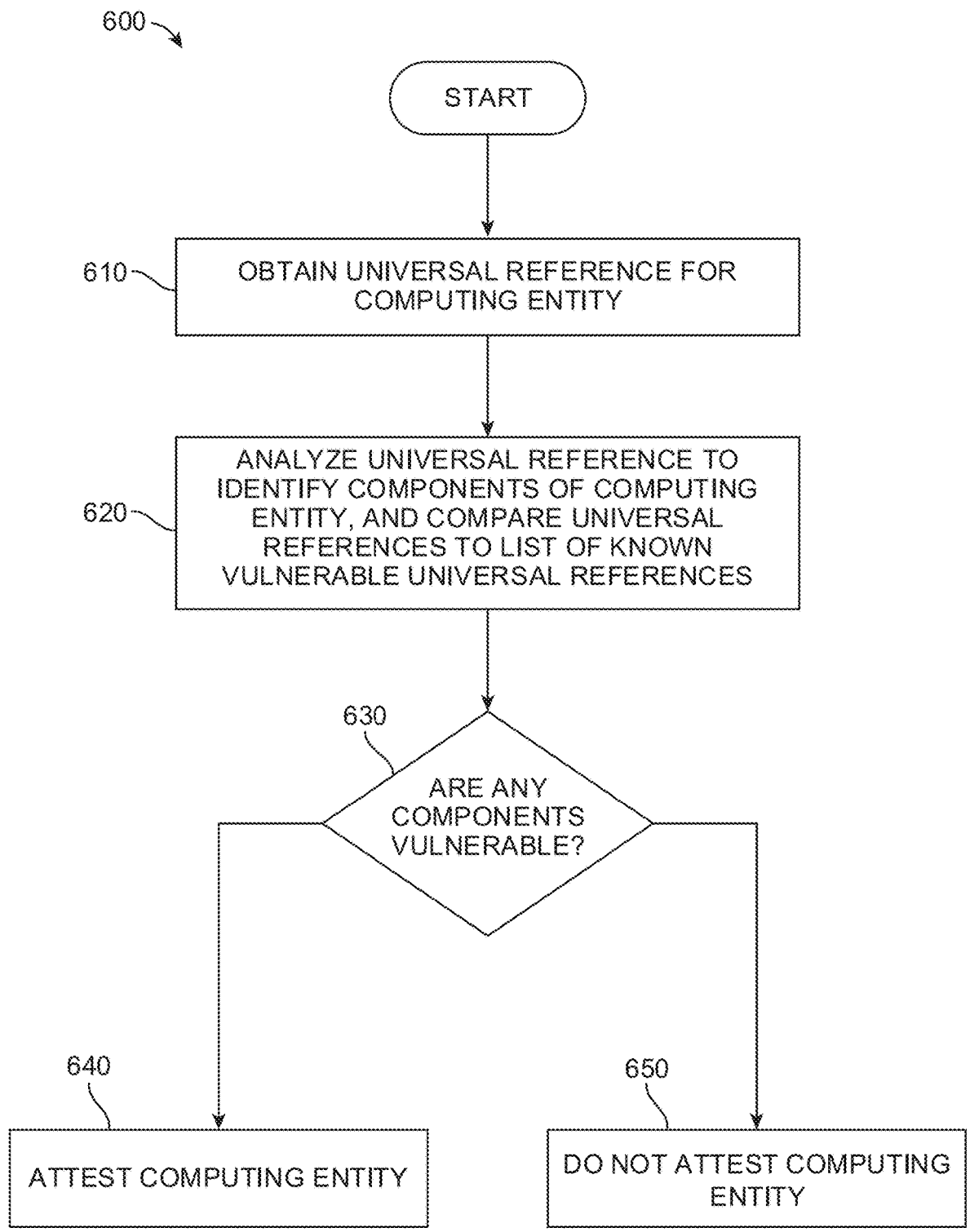
FIG. 6 is a flow chart depicting a method for performing an attestation task using a universal reference, in accordance with an example embodiment.

FIG. 6 is a flow chart depicting a method 600 for performing an attestation task using a universal reference, in accordance with an example embodiment.

A universal reference for a computing entity is obtained at operation 610. A computing entity may request attestation so that the computing entity can be granted access to a secure network by providing the computing entity's universal reference to an attestation server, which may or may not be associated with the secure network. In some embodiments, attestation is performed to provide a secure enclave, or trusted execution environment, which is a set of system resources that operates in the same security domain and shares the protection of a single, common, continuous security perimeter. The enclave uses the attestation process to prove its identity and build trust with an external service.

The universal reference is analyzed to identify components of the computing entity at operation 620. The universal reference can be expanded by querying a repository to determine an exhaustive listing of components of the computing entity. Any universal references that are obtained can be compared to a list of known trustworthy or untrustworthy references. Operation 630 determines whether any components are vulnerable or otherwise untrustworthy. Each of the components can be compared to a predetermined listing of known trustworthy and/or known untrustworthy components in order to attest the computing entity as a whole. If all of the components are trustworthy, then the computing entity may be attested at operation 640; otherwise, the computing entity may not be attested at operation 650. In some embodiments, there may be levels of trustworthiness based on the severity and/or number of vulnerable components. Additionally or alternatively, some components may be trusted despite containing vulnerabilities because those specific vulnerabilities do not present a risk to the particular secure network. For example, a vulnerability in a computing entity's operating system may not matter to a server running a different operating system.

Figure 7:
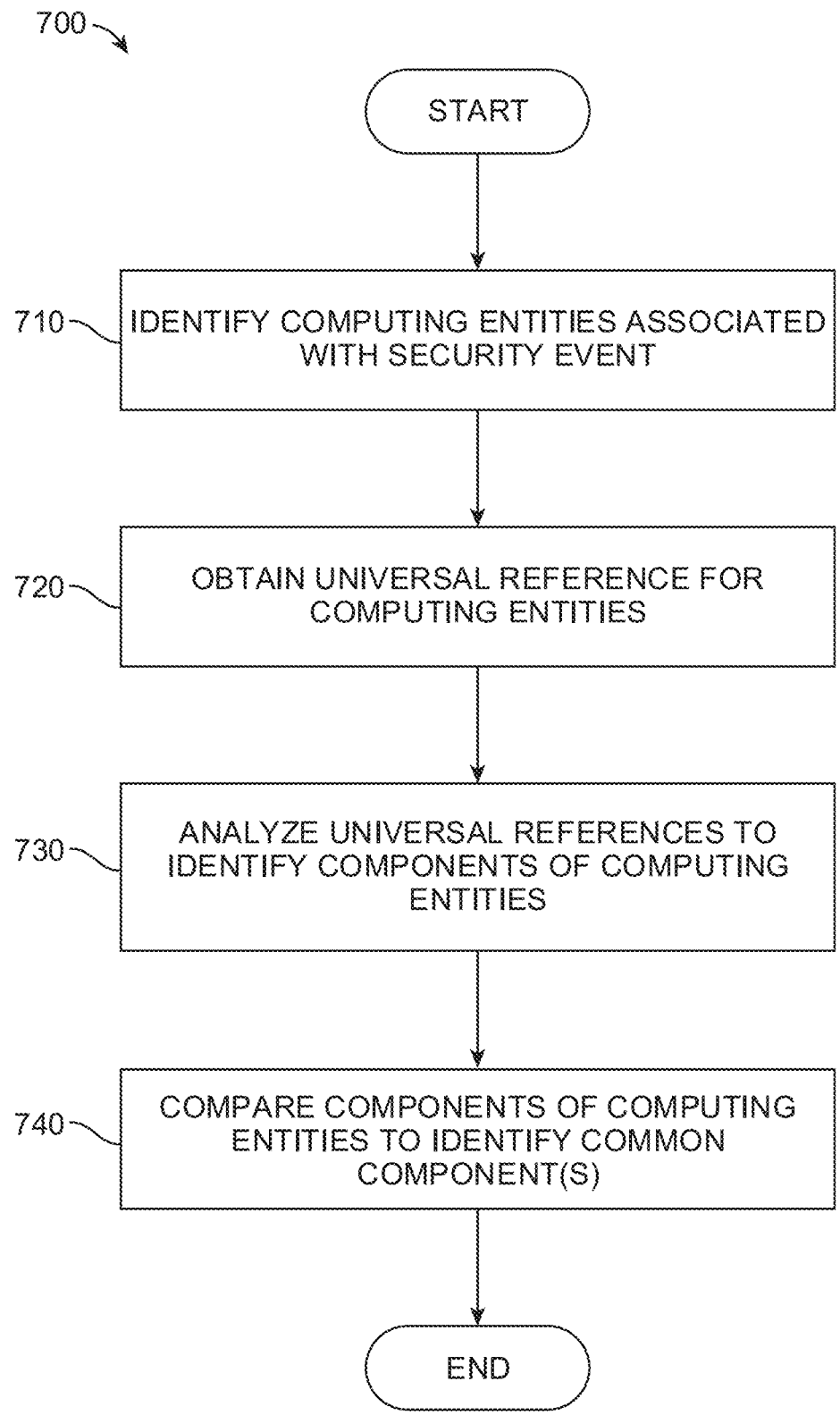
FIG. 7 is a flow chart depicting a method for performing a forensics task using universal references, in accordance with an example embodiment.

FIG. 7 is a flow chart depicting a method 700 for performing a forensics task using universal references, in accordance with an example embodiment.

Computing entities associated with the same security event are identified at operation 710. The security event may include an unauthorized access event, a denial-of-service event, a bug or error, an exploit, and/or any other event that can be investigated to determine a root cause. The computing entities may be identified based on a log that includes their identities, or the computing entities may request to participate in the network forensics task. In some embodiments, the computing entities are identified based on feedback or telemetry data that the computing entities provide to a server regularly or on an ad hoc basis.

Universal references for each of the identified computing entities are obtained at operation 720. The computing entities may self-report their universal references, the universal references can be requested from the computing entities, or they may be received out-of-band. In some embodiments, the universal references are obtained by consulting a version control server or database that stores relationships between identities of computing entities and their corresponding universal references.

The universal references are analyzed to identify the components of the computing entities at operation 730. The universal references may be expanded by querying a repository to determine the universal references, and accordingly, the identities, of all components of the computing entities. The components are compared to identify one or more common components at operation 740. In some embodiments, the universal references are compared to identify a same universal reference, and once identified, that universal reference is used to consult a database to determine the component that is in common. Components may be compared using a largest common subtree approach or other comparison algorithms to identify common elements of compared sets. If the comparison can narrow down a single common component, that common component may automatically be identified as the root cause of the security event. In some embodiments, a list of common components is output for further investigation. In some embodiments, any components identified as being associated with a security event (e.g., a vulnerability) may be stored in a database that can be used for attestation purposes.

Figure 8:
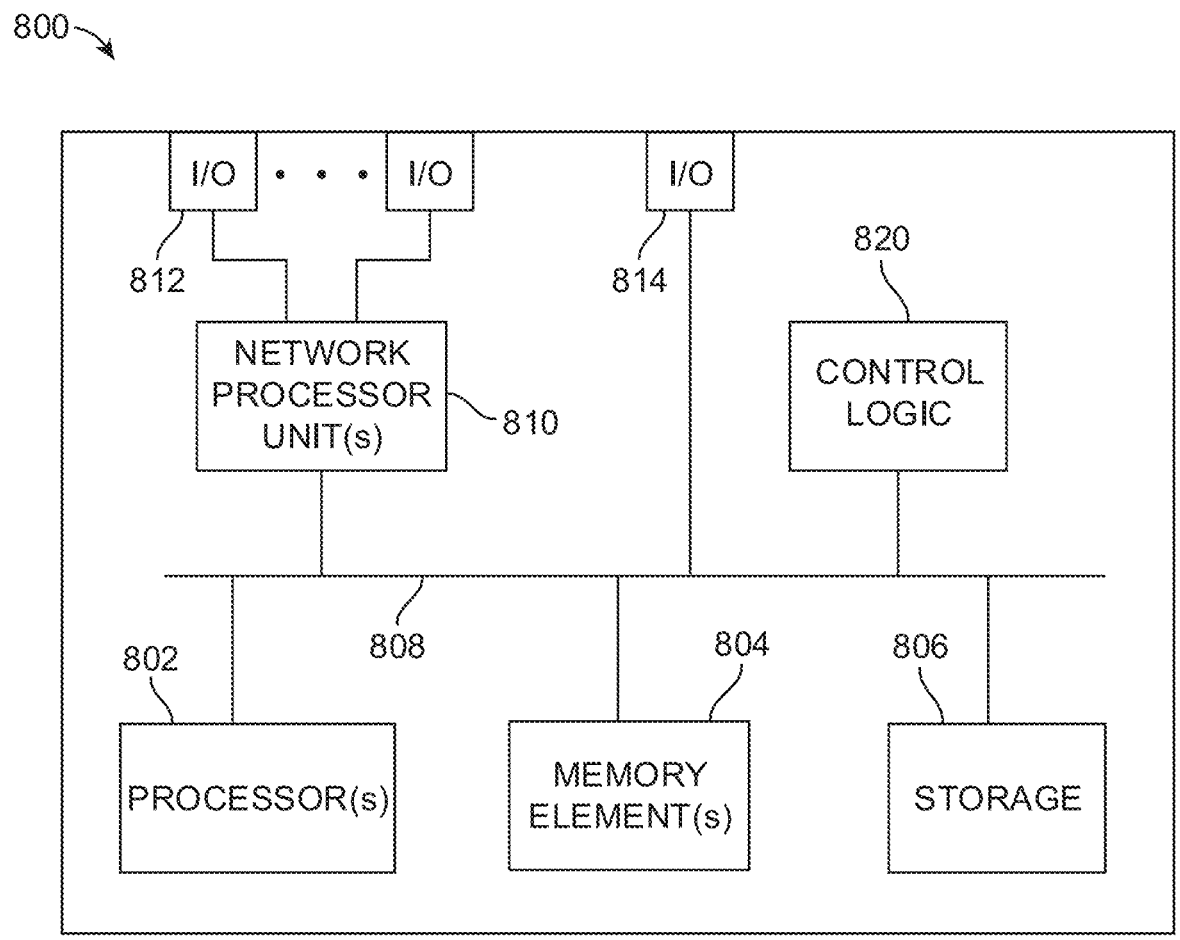
FIG. 8 is a block diagram depicting a computing device configured to generate and/or utilize universal references, in accordance with an example embodiment.

Referring to FIG. 8, FIG. 8 illustrates a hardware block diagram of a computing device 800 that may perform functions associated with operations discussed herein in connection with the techniques depicted in FIGS. 1-7. In various embodiments, a computing device, such as computing device 800 or any combination of computing devices 800, may be configured as any entity/entities as discussed for the techniques depicted in connection with FIGS. 1-7 in order to perform operations of the various techniques discussed herein.

In at least one embodiment, the computing device 800 may include one or more processor(s) 802, one or more memory element(s) 804, storage 806, a bus 808, one or more network processor unit(s) 810 interconnected with one or more network input/output (I/O) interface(s) 812, one or more I/O interface(s) 814, and control logic 820. In various embodiments, instructions associated with logic for computing device 800 can overlap in any manner and are not limited to the specific allocation of instructions and/or operations described herein.

In at least one embodiment, processor(s) 802 is/are at least one hardware processor configured to execute various tasks, operations and/or functions for computing device 800 as described herein according to software and/or instructions configured for computing device 800. Processor(s) 802 (e.g., a hardware processor) can execute any type of instructions associated with data to achieve the operations detailed herein. In one example, processor(s) 802 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 804 and/or storage 806 is/are configured to store data, information, software, and/or instructions associated with computing device 800, and/or logic configured for memory element(s) 804 and/or storage 806. For example, any logic described herein (e.g., control logic 820) can, in various embodiments, be stored for computing device 800 using any combination of memory element(s) 804 and/or storage 806. Note that in some embodiments, storage 806 can be consolidated with memory element(s) 804 (or vice versa), or can overlap/exist in any other suitable manner.

In at least one embodiment, bus 808 can be configured as an interface that enables one or more elements of computing device 800 to communicate in order to exchange information and/or data. Bus 808 can be implemented with any architecture designed for passing control, data and/or information between processors, memory elements/storage, peripheral devices, and/or any other hardware and/or software components that may be configured for computing device 800. In at least one embodiment, bus 808 may be implemented as a fast kernel-hosted interconnect, potentially using shared memory between processes (e.g., logic), which can enable efficient communication paths between the processes.

In various embodiments, network processor unit(s) 810 may enable communication between computing device 800 and other systems, entities, etc., via network I/O interface(s) 812 (wired and/or wireless) to facilitate operations discussed for various embodiments described herein. In various embodiments, network processor unit(s) 810 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between computing device 800 and other systems, entities, etc. to facilitate operations for various embodiments described herein. In various embodiments, network I/O interface(s) 812 can be configured as one or more Ethernet port(s), Fibre Channel ports, any other I/O port(s), and/or antenna(s)/antenna array(s) now known or hereafter developed. Thus, the network processor unit(s) 810 and/or network I/O interface(s) 812 may include suitable interfaces for receiving, transmitting, and/or otherwise communicating data and/or information in a network environment.

I/O interface(s) 814 allow for input and output of data and/or information with other entities that may be connected to computing device 800. For example, I/O interface(s) 814 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 820 can include instructions that, when executed, cause processor(s) 802 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 820) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 804 and/or storage 806 can store data, software, code, instructions (e.g., processor instructions), logic, parameters, combinations thereof, and/or the like used for operations described herein. This includes memory element(s) 804 and/or storage 806 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

In one form, a method is provided comprising: obtaining a universal reference for a computing entity, wherein the universal reference identifies one or more components of the computing entity by additional universal references assigned to the one or more components; determining a hierarchical description of the computing entity by enumerating each additional universal reference of the one or more components and additional sub-components, wherein the hierarchical description exhaustively identifies components and sub-components of the computing entity; analyzing the hierarchical description by accessing a database to identify mappings of the additional universal references to the one or more components and sub-components; and assessing the one or more components and sub-components identified by analyzing the hierarchical description, to perform one or more of: an inventory task, a policy enforcement task, an attestation task, and a forensics task.

In another form, the computing entity is selected from a group of: a hardware configuration, a software object, a firmware object, and a software object and corresponding hardware configuration used to execute the software object.

In another form, performing the attestation task comprises assigning an identity to the computing entity based on the universal reference of the computing entity, wherein the identity indicates that the computing entity is a known trusted system.

In another form, performing the forensics task comprises: determining that the computing entity is associated with a vulnerability, and storing the hierarchical description of the computing entity to indicate that the computing entity is associated with the vulnerability.

In another form, the method further includes comparing the hierarchical description of the computing entity to one or more other hierarchical descriptions of other computing entities associated with the vulnerability to identify at least one common component or sub-component.

In another form, the computing entity comprises a software object, and wherein the universal reference is embedded into the software object.

In another form, the universal reference is generated by analyzing a bill of materials of the computing entity.

In another form, a component or sub-component includes a shared library that is utilized at runtime of the computing entity.

In one form, a computer system is provided, comprising: one or more computer processors; one or more computer readable storage media; and program instructions stored on the one or more computer readable storage media for execution by at least one of the one or more computer processors, the program instructions comprising instructions to: obtain a universal reference for a computing entity, wherein the universal reference identifies one or more components of the computing entity by additional universal references assigned to the one or more components; determine a hierarchical description of the computing entity enumerating each additional universal reference of the one or more components and additional sub-components, wherein the hierarchical description exhaustively identifies components and sub-components of the computing entity; analyze the hierarchical description by accessing a database to identify mappings of additional universal references to the one or more components and sub-components; and assess the one or more components and sub-components identified the analyzing of the hierarchical description, to perform one or more of: an inventory task, a policy enforcement task, an attestation task, and a forensics task.

In one form, one or more computer readable storage media is provided, the one or more computer readable storage media collectively having program instructions embodied therewith, the program instructions executable by a computer to cause the computer to: obtain a universal reference for a computing entity, wherein the universal reference identifies one or more components of the computing entity by additional universal references assigned to the one or more components; determine a hierarchical description of the computing entity by enumerating each additional universal reference of the one or more components and additional sub-components, wherein the hierarchical description exhaustively identifies the components and sub-components of the computing entity; analyze the hierarchical description by accessing a database to identify mappings of the one or more additional universal references to the one or more components and sub-components; and assess the one or more components and sub-components identified by analyzing of the hierarchical description, to perform one or more of: an inventory task, a policy enforcement task, an attestation task, and a forensics task.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
    obtaining a universal reference for a computing entity, wherein the universal reference identifies one or more components of the computing entity by referencing additional universal references that are each assigned to the one or more components, and wherein the universal reference comprises a hash of a description of the computing entity combined with a hash of a description of the one or more components;
    determining a hierarchical description of the computing entity by enumerating each additional universal reference of the one or more components and additional sub-components, wherein the hierarchical description identifies each of the one or more components and additional sub-components of the computing entity;
    analyzing the hierarchical description by accessing a database to identify mappings of the additional universal references to the one or more components and sub-components; and
    assessing the one or more components and sub-components identified by analyzing the hierarchical description, to perform one or more of: an inventory task, a policy enforcement task, an attestation task, and a forensics task.

2. The computer-implemented method of claim 1, wherein the computing entity is selected from a group of: a hardware configuration, a software object, a firmware object, and a software object and corresponding hardware configuration used to execute the software object.

3. The computer-implemented method of claim 1, wherein performing the attestation task comprises assigning an identity to the computing entity based on the universal reference of the computing entity, wherein the identity indicates that the computing entity is a known trusted system.

4. The computer-implemented method of claim 1, wherein performing the forensics task comprises:
    determining that the computing entity is associated with a vulnerability; and
    storing the hierarchical description of the computing entity to indicate that the computing entity is associated with the vulnerability.

5. The computer-implemented method of claim 4, further comprising:
    comparing the hierarchical description of the computing entity to one or more other hierarchical descriptions of other computing entities associated with the vulnerability to identify at least one common component or sub-component.

6. The computer-implemented method of claim 1, wherein the computing entity comprises a software object, and wherein the universal reference is embedded into the software obj ect.

7. The computer-implemented method of claim 1, wherein the universal reference is generated by analyzing a bill of materials of the computing entity.

8. The computer-implemented method of claim 1, wherein a component or sub-component includes a shared library that is utilized at runtime of the computing entity.

9. An apparatus comprising:
    one or more computer processors;
    a network interface configured to enable network communications;

one or more computer readable storage media; and
program instructions stored on the one or more computer readable storage media for execution by at least one of the one or more computer processors, the program instructions comprising instructions to:
- obtain a universal reference for a computing entity, wherein the universal reference identifies one or more components of the computing entity by referencing additional universal references that are each assigned to the one or more components, and wherein the universal reference comprises a hash of a description of the computing entity combined with a hash of a description of the one or more components;
- determine a hierarchical description of the computing entity enumerating each additional universal reference of the one or more components and additional sub-components, wherein the hierarchical description identifies each of the one or more components and additional sub-components of the computing entity;
- analyze the hierarchical description by accessing a database to identify mappings of additional universal references to the one or more components and sub-components; and
- assess the one or more components and sub-components identified by analyzing of the hierarchical description, to perform one or more of: an inventory task, a policy enforcement task, an attestation task, and a forensics task.

10. The apparatus of claim 9, wherein the computing entity is selected from a group of: a hardware configuration, a software object, a firmware object, and a software object and corresponding hardware configuration used to execute the software object.

11. The apparatus of claim 9, wherein performing the attestation task comprises assigning an identity to the computing entity based on the universal reference of the computing entity, wherein the identity indicates that the computing entity is a known trusted system.

12. The apparatus of claim 9, wherein the instructions to perform the forensics task comprise instructions to:
- determine that the computing entity is associated with a vulnerability; and
- store the hierarchical description of the computing entity to indicate that the computing entity is associated with the vulnerability.

13. The apparatus of claim 12, further comprising instructions to:
- compare the hierarchical description of the computing entity to one or more other hierarchical descriptions of other computing entities associated with the vulnerability to identify at least one common component or sub-component.

14. The apparatus of claim 9, wherein the computing entity comprises a software object, and wherein the universal reference is embedded into the software object.

15. The apparatus of claim 9, wherein the universal reference is generated by analyzing a bill of materials of the computing entity.

16. The apparatus of claim 9, wherein a component or sub-component includes a shared library that is utilized at runtime of the computing entity.

17. One or more non-transitory computer readable storage media collectively having program instructions embodied therewith, the instructions executable by a computer to cause the computer to:
- obtain a universal reference for a computing entity, wherein the universal reference identifies one or more components of the computing entity by referencing additional universal references that are each assigned to the one or more components, and wherein the universal reference comprises a hash of a description of the computing entity combined with a hash of a description of the one or more components;
- determine a hierarchical description of the computing entity by enumerating each additional universal reference of the one or more components and additional sub-components, wherein the hierarchical description identifies each of the one or more components and additional sub-components of the computing entity;
- analyze the hierarchical description by accessing a database to identify mappings of one or more additional universal references to the one or more components and sub-components; and
- assess the one or more components and sub-components identified by analyzing of the hierarchical description, to perform one or more of: an inventory task, a policy enforcement task, an attestation task, and a forensics task.

18. The one or more non-transitory computer readable storage media of claim 17, wherein the computing entity is selected from a group of: a hardware configuration, a software object, a firmware object, and a software object and corresponding hardware configuration used to execute the software object.

19. The one or more non-transitory computer readable storage media of claim 17, wherein performing the attestation task comprises assigning an identity to the computing entity based on the universal reference of the computing entity, wherein the identity indicates that the computing entity is a known trusted system.

20. The one or more non-transitory computer readable storage media of claim 17, wherein the instructions to perform the forensics task cause the computer to:
- determine that the computing entity is associated with a vulnerability; and
- store the hierarchical description of the computing entity to indicate that the computing entity is associated with the vulnerability.

* * * * *